Sept. 11, 1962 W. W. SPOONER 3,053,310
APPARATUS FOR ALIGNING PLURAL SUPERPOSED WEBS
Filed Sept. 1, 1959 5 Sheets-Sheet 4
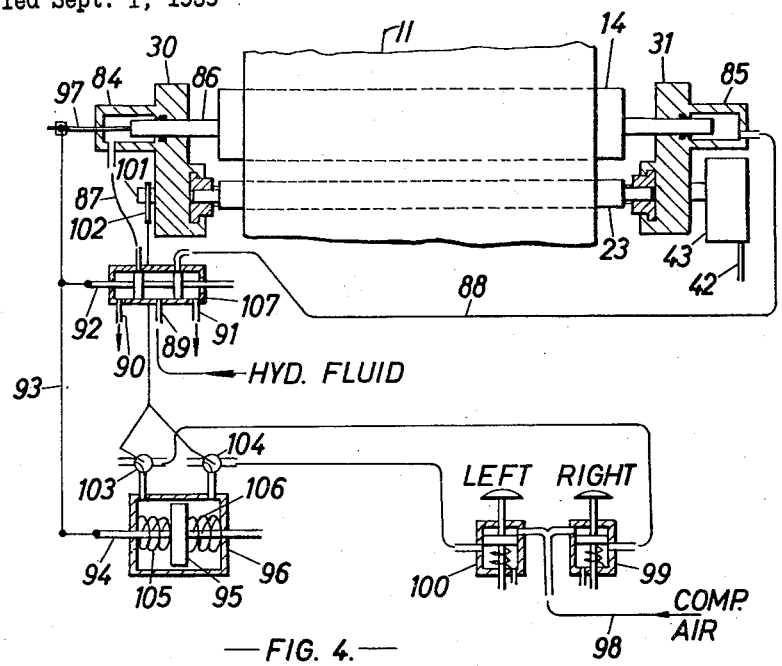
— FIG. 4. —
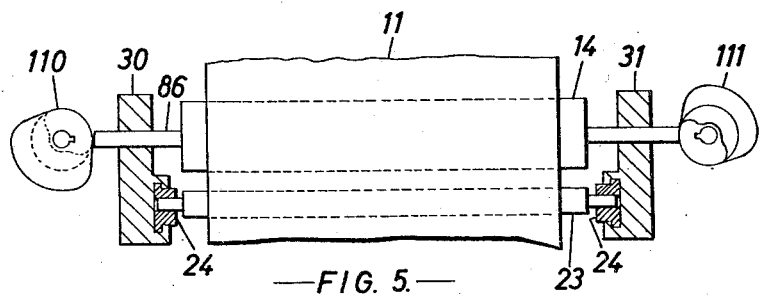
— FIG. 5. —
INVENTOR
William Wycliffe Spooner
BY
Mead, Browne, Schuyler & Beveridge
ATTORNEYS

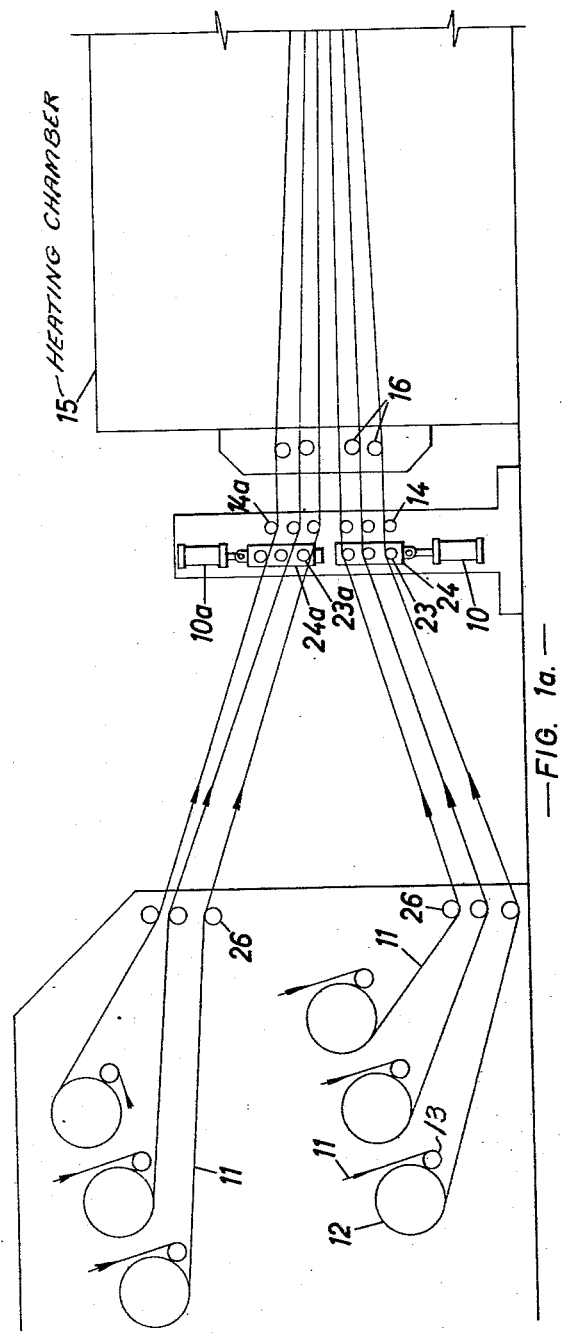

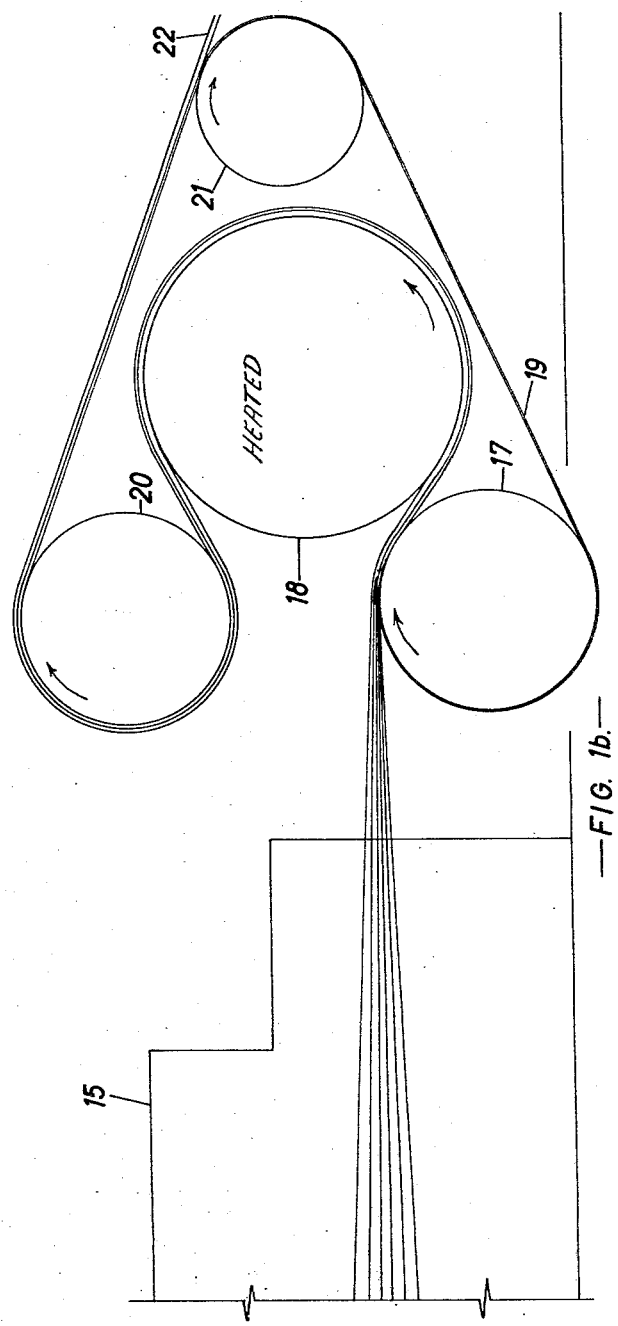

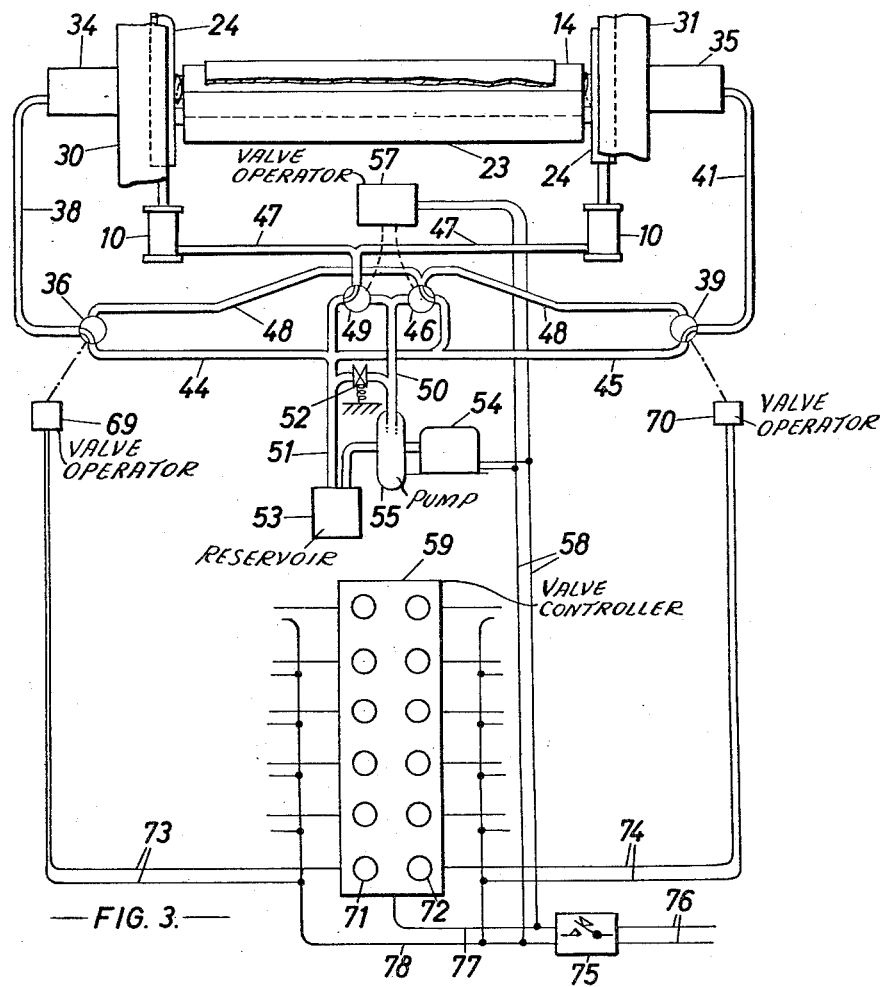

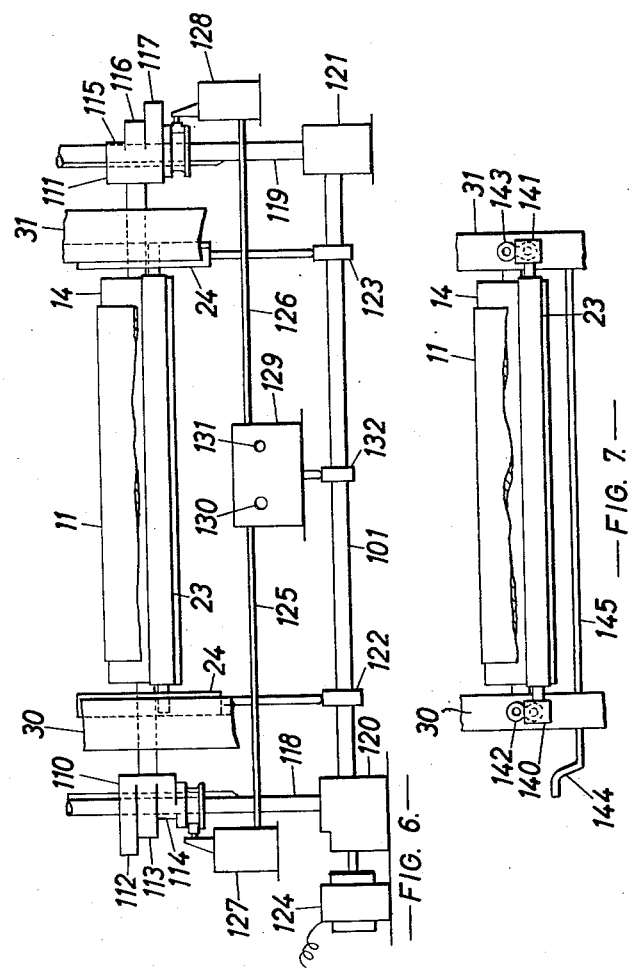

United States Patent Office 3,053,310
Patented Sept. 11, 1962

3,053,310
APPARATUS FOR ALIGNING PLURAL SUPERPOSED WEBS
William Wycliffe Spooner, Ilkley, England, assignor to The Spooner Dryer & Engineering Co. Limited, Ilkley, Yorkshire, England
Filed Sept. 1, 1959, Ser. No. 837,522
Claims priority, application Great Britain Sept. 3, 1958
15 Claims. (Cl. 156—499)

The invention relates to material guiding apparatus and more particularly to apparatus or guiding a moving length of material over a roller.

In the manufacture of multi-ply webbing or belting, that is, webbing comprising several plies of material laid one upon another, it is usual to pass the several plies of material, which material has been previously impregnated with a suitable resin or the like, through a heating oven to soften the resin and then to press the plies together, if necessary with the further application of heat, to produce the multi-ply webbing. It is generally then necessary to guillotine the edges of the webbing because the separate plies of material are not laid exactly one upon another but are transversely out of alignment. This misalignment is caused to a certain extent through the several plies of material of which the webbing is composed not being of exactly the same width, but more particularly it is due to the fact that the several plies of material tend to wander transversely of their direction of movement through the heating oven.

The plies of material are usually passed over a roller before entering the heating oven. By giving the roller lateral movement the path of the ply can be displaced to one side or the other. However, the possible amount of lateral displacement of the roller is limited so that if the path of the ply continued to wander in one lateral direction there is a limit to the corrective displacement which can be applied by the roller.

It has been proposed to use flanged rollers to keep the plies of material in alignment. However, it has been found that the flanged rollers soon become covered with polyvinyl chloride when using material impregnated with polyvinyl chloride. Also if the ply tends to wander it has been found that the ply climbs up the flange, thus leading to a considerable risk of an accident.

An object of the present invention is to provide means for displacing the path of a moving length of material relatively to a given path by axially displacing either a main roller member, such as a main roller or an auxiliary roller member, such as an auxiliary roller in one direction whilst said main roller member carries the weight of the material and axially returning said displaced member in the other direction whilst the weight of the material is substantially removed from said main roller member and is carried by said auxiliary roller member so as to displace the path of the moving length of material relatively to the given path. When the path of the moving material wanders from the given path it is thus possible to return it substantially to the given path.

By the term "weight of the material" is meant the net force applied by the material to the roller member carrying the weight thereof due to gravity and to tension in the material and according to the angle through which the material turns as it passes across the roller.

According to one feature of the present invention a method of transversely guiding a moving length of material comprises establishing axial displacement of a main roller member or an auxiliary roller member from a normal axial position when the weight of said material is carried by said main roller member and then returning said axially displaced roller member to said normal axial position when the weight of the material is substantially removed from said main roller member and is substantially carried by said auxiliary roller member.

When main and auxiliary rollers are employed, the method includes moving said auxiliary roller relatively to said main roller before or after establishing axial displacement of the main and auxiliary rollers in said one direction thereby lifting the weight of moving material passing over said main roller substantially therefrom and replacing the weight of said moving length of material on to said main roller before or after establishing relative axial displacement between said rollers in said other direction respectively.

According to another feature of the present invention apparatus for laterally guiding a moving length of material with which a main roller member is normally in weight-carrying contact, comprises an auxiliary roller member adapted to be placed adjacent and substantially parallel to said main roller member, and means for moving said auxiliary roller member relatively to the path of said material on said main roller member into and out of a weight-carrying relative position, in which it relieves said main roller member of the weight of said material normally carried thereby, and for axially displacing one of said roller members from a normal axial position when said auxiliary roller member is in said weight-carrying relative position, and returning said axially displaced roller member to said normal axial position when said auxiliary roller member is out of its weight-carrying relative position. Preferably said main roller member is substantially axially fixed and said auxiliary roller member is axially displaceable either way from a mid-position.

The roller members are preferably roughened, such as by circumferential grooves, to increase the coefficient of friction between them and the material.

According to a further feature of the present invention apparatus for bringing a plurality of moving lengths of material into face-to-face contact and substantially into transverse alignment, such as in the manufacture of multi-ply webbing, comprises a plurality of associate main and auxiliary roller members, a common roller, and means for selectively establishing axial displacement of each main roller member or its associated auxiliary roller member from a normal axial position when the weight of the material is substantially carried by said main roller member and returning said axially displaced roller member to said normal axial position when the weight of the moving length of material is substantially carried by said auxiliary roller member, whereby a plurality of moving lengths of material can be brought into face-to-face contact whilst passing over said common roller and can be guided so that as they are passed over said common roller they are kept substantially in transverse alignment.

It may be convenient to provide a common means for raising and lowering several auxiliary rollers relatively to material passing over their associated main rollers and further means for selectively axially displacing either each of said auxiliary rollers or each of said main rollers.

It is generally most convenient to make the auxiliary roller member axially displaceable from a mid position, the auxiliary roller member being first displaced whilst moving material is carried thereby, and then returned back to said mid position when the moving material is carried by said main roller member. If it is desired to displace the path of the moving material to the right (or left) (when looking in the direction of movement of the material) then the auxiliary roller member is first displaced to the right (or left) whilst the material is being carried thereby. The auxiliary roller member is subsequently relieved of the weight of material by the main roller member and the material is then moved along a path displaced to the right (or left) of its previous path.

The auxiliary roller member is recentralized ready to be displaced again to the right (or left) as required.

If the run of the material has not been sufficiently corrected then another displacement or several other displacements may be necessary to bring it in line.

The stroke may be comparatively small, say ¾" or 1" and if the material has wandered, say 2" away two or three displacements will be necessary to rectify the run. It is possible that if there is a very bad and tight selvedge on one side of the material, it might be necessary to correct the wandering continuously.

The invention will be further described by way of example with reference to the accompanying drawings in which:

Figs. 1a and 1b are schematic diagrams which, when placed together illustrate generally a machine used in the manufacture of multi-ply webbing or belting, FIGS. 2 and 3 show main and auxiliary rollers in plan view and in side elevation respectively and illustrate diagrammatically guiding apparatus according to one embodiment of the invention, FIG. 4 shows main and auxiliary rollers in plan view and illustrates diagrammatically guiding apparatus according to another embodiment of the invention, FIGS. 5 and 6 illustrate main and auxiliary rollers in plan view and in side elevation respectively and illustrate diagrammatically a further embodiment of the invention, and FIG. 7 shows main and auxiliary rollers in side elevation and illustrates diagrammatically guiding apparatus according to a still further embodiment of the invention.

In FIGS. 1a and 1b several plies of material 11 impregnated with resin such as, for example polyvinyl chloride, are fed from reels (not shown). The plies first pass round braking rollers 12 and 13 and rollers 26 before passing across main rollers 14 or 14a and into a heating chamber 15, some of the plies also passing over further rollers 16. The lengths of material emerging from the heating chamber 15 are brought together on a common roller 17. The several plies of material 11 are then pressed together on a drum 18 by means of a felt or the like 19 passing over rollers 17, 20 and 21. If necessary further heat can be applied to the material whilst on the drum 18 by a heating means (not shown). The resin with which the material is impregnated and which has been softened by the application of heat then bonds the several plies of material together to form a multi-ply webbing 22 which is led from the drum over the roller 20 and is ready for further processing such as trimming, facing and edging.

The moving plies of material 11 pass over the main rollers 14 and under the main rollers 14a. Auxiliary rollers 23 are mounted in bearings in a common slide which is illustrated diagrammatically at 24, the auxiliary rollers 23 being associated with the main rollers 14 over which the material 11 passes. Auxiliary rollers 23a are associated with the main rollers 14a and are mounted in bearings in another slide illustrated diagrammatically at 24a.

In operation, whilst material is continuously moving through the apparatus an operator standing near to the common roller 17 ensures that the separate moving plies of material are brought together substantially in alignment. The slides 24 and 24a are periodically operated by hydraulic cylinders 10 and 10a to lift the moving plies of material 11 off the main rollers 14 and 14a. By means of a remote control the operator can selectively cause a main and associated auxiliary roller to move axially relatively to one another in one direction whilst the material is in contact with the main roller and relatively axially to one another in the other direction whilst the weight of the material is lifted from the main roller. The operator can thus selectively guide the material over the main rollers 14 and 14a so that the several plies of material as they pass round the common roller 17 can be kept substantially in alignment.

As will be described hereafter, the operator can selectively axially displace a main roller from a mid position to the right or left whilst the main roller is carrying the load of the ply for example by hand, by means of a pneumatic or hydraulic system, mechanically or electrically. The weight of the ply is then taken off the main roller by the auxiliary roller. (The slide 24 in FIG. 1a is shown in a position in which the auxiliary rollers 23 carry the load whereas the slide 24a is shown in a position in which the main rollers carry the load.) The main roller can then return to its mid position, for example, under the influence of springs. The auxiliary rollers can then lower the material on to the main rollers again.

Referring now to FIGS. 2 and 3, which illustrate diagrammatically guiding apparatus according to one embodiment of the invention, a main roller 14 is rotatably and axially slidably mounted in bearings in supports 30 and 31 and an auxiliary roller 23 is mounted in bearings in slides 24 which can be vertically raised and lowered by means of hydraulic cylinders 10. The main roller 14 can be axially displaced by hydraulic pressure in cylinders 34 or 35 acting upon pistons 32 or 33 to press the spindle carrying the main roller 14 to the right or left respectively. The springs 61 and 62 can return the main roller 14 to the mid position illustrated when no hydraulic pressure is applied to the pistons 32 and 33.

Referring now more particularly to FIG. 3, which illustrates diagrammatically a hydraulic system for operating the cylinders 10, 34 and 35, a pump 55 driven by an electric motor 54 draws oil from a reservoir 53 and delivers it through a supply conduit 50. A pressure relief valve 52 is provided between the supply conduit and a drain conduit 51 leading back to the reservoir 53. A valve 49 is adapted to selectively connect the cylinders 10 via conduits 47 to the supply conduit 50 or to the drain conduit 51. A valve 46 is adapted to selectively connect conduits 48 to the supply conduit 50 or the drain conduit 51. Valves 36 and 39 are adapted to selectively connect the cylinders 34 and 35 to the conduits 48 or via conduits 44 and 45 to the drain conduit 51 respectively. In the drawings all the valves are shown in their position for connection of the drain conduit 51. An automatic valve operator 57 is provided for sequentially connecting the conduits 48 to the supply conduit 50, connecting the conduits 47 to the supply conduit 50, returning the connection of the conduits 48 to the drain conduit 51, and returning the connection of the conduits 47 to the drain conduit 51. Valve operators 69, 70 are provided for operating the valves 36 and 39 to connect the conduits 48 via the conduit 38 to the cylinders 34 or via the conduit 41 to the cylinder 35 respectively.

An electrical power supply for operation of the valves is indicated at 76. Upon closure of switch 75 power is supplied through leads 58 to the automatic valve operator 57 and to the electric motor 54 driving the pump 55. A controller 59 is provided for controlling the valve operators 69, 70, a lead 77 from the switch 75 being connected to the controller. Leads 73 and 74 from the valve operators 69, 70 respectively are connected to the controller and by a lead 78 to the switch 75. The controller 59 has push buttons or switches such as 71 and 72 for supplying electric current to the valve operators 69, 70. The valve operators 69, 70 may, for example each comprise a solenoid, energization of which operates the valve 36 or 39 so as to connect the conduits 38 or 41 to the conduits 48 respectively. The valves 36 and 39 return to their positions shown, for example, under the influence of springs, upon de-energization of the solenoids. The automatic valve operator 57 preferably contains an automatically electrically operated timing device for periodically and sequentially operating the valves 46 and 49. Thus, hydraulic fluid under pressure will periodically be supplied via the supply conduit 50 and conduits 47 to the cylinders 10 to periodically raise the slides 24 carrying the auxiliary roller 23.

In operation, if it is desired to displace the path of the moving material 11 to the right (when looking along the direction of motion of the material), then the operator presses the button 71 to energize the solenoid of the valve operator 69. The cylinder 34 is thus connected via the conduit 38 to the conduits 48. The automatic valve operator 57 automatically connects the conduits 48 to the supply conduit 50 at predetermined intervals of time. Upon such connection hydraulic fluid is supplied to the cylinder 34 to displace the main roller 14 to the right carrying the material 11 with it. The valve 49 is then operated by automatic valve operator 57 to connect the cylinders 10 to the supply conduit 50 thus raising the auxiliary roller 23. This lifts the moving material 11 off the main roller 14 whereupon the automatic valve operator returns the valve 46 to its position shown so that the cylinder 34 will drain via the conduits 38, 44 and 51 to the reservoir 53 and the main roller 14 will return to its mid position under the influence of the spring 62. The automatic valve operator thereupon returns the valve 49 to its position shown so that the auxiliary roller can then return the length of material 11 which is moving along its new path on to the main roller 14 ready for further displacement if so required. In the embodiment just described it is necessary to hold the button 71 pressed until the displacement has taken place, since the timing of the automatic valve operator 57 is independent of the button 71. If the button 71 is further held pressed for a sufficient length of time further displacement of the material 11 may subsequently take place since the operation of the automatic valve operator is repeated periodically. Pressing the button 72 will in similar manner displace the path of the moving material 11 to the left.

In FIGS. 2 and 3 only one set of main and auxiliary rollers are shown. As illustrated in FIG. 1a six such sets may be provided. The cylinders 10 operate the slides 24 whereas cylinders 10a operate slides 24a. The cylinders 10a can also be connected to the conduits 47 of Fig. 3. However, separate valves such as 36 and 39 will be required for each set of main and auxiliary rollers. These valves may, however, be all connected to the same conduits 48, 44 and 45. The controller 59 is shown as being provided with six sets of buttons such as 71 and 72 for selective operation of each set of main and auxiliary rollers. Upon connection of the cylinder 10 to the drain conduit 51 the auxiliary rollers may be allowed to return to their lower position under their own weight to lower the material on to the main roller 14. However, it will be appreciated that some means such as spring means (not shown) will be required to raise the slide 24a to allow the moving material to fall back on to the rollers 14a when the cylinder 10a is connected to the drain conduit 51.

The controller 59 may conveniently be placed at a position remote from the main and auxiliary rollers such as adjacent the common roller 17 so that the operator can control the paths of the seevral plies of material from a position at which he can conveniently see that the plies are coming together in substantial alignment. It will be appreciated that other means may be provided for controlling the valves 36 and 39, such as a pneumatic system. In such a system compressed air pipes can replace the electric leads 73 and 74 and compressed air will be supplied to the controller 59 in which controller the buttons 71 and 72 will be replaced by suitable compressed air valves.

In a slightly different arrangement the valve 46 is dispensed with, the conduits 48 being connected directly to the supply conduit 50 and the valve members of the valves 36, 39 and 49 are automatically operated periodically by means of cams on a continuously rotating cam shaft. The valves 36 and 39 in this case are of the type in which, for reciprocation of the valve member by means of the cam shaft when the valve member is in one angular position, the conduits 38 and 41 are always connected to the conduits 44 and 45 respectively, whereas for another angular position of the valve member operation thereof by the cams connects the conduits 38 and 41 to conduits 48. Thus, by altering the angular position of the valve member of valve 36 or 39 (for example by means of a rack and pinion, the operation is able to cause the path of the material 11 to be displaced selectively to the right or left.

In the embodiment of FIG. 4 the hydraulic fluid in the cylinders 84 and 85 acts directly on the ends of the spindle 86 carrying the main roller 14, no pistons being provided in this case. Hydraulic fluid is supplied to the cylinders 84 and 85 from a control valve 107 through conduits indicated at 87 and 88 respectively. Hydraulic fluid is supplied to the valve 107 at 89 and drains are provided at 90 and 91. A valve spindle 92 of the control valve 107 is operated by lever 93 connected to the piston rod 94 of piston 95 movable in an air cylinder 96. In order to provide a feed back control for the valve 107 the lever 93 is also connected to an extension 97 of the spindle 86 so as to permit relative rotation between the spindle 86 and the upper end of the lever 93 but substantially no relative axial displacement. Air can be supplied to the air cylinder from a compressed air supply indicated at 98 through control valves 99 and 100.

In the embodiment of FIG. 4 a cam shaft having cams which raise and lower the auxiliary roller 23 is partly shown at 101. The cam shaft is driven from shaft 42 through gear box 43. A cam 102 is provided on the cam shaft 101 for operating valves 103 and 104 placed adjacent the ports of the air cylinder 96. The cam 102 ensures that compressed air can only be admitted to one or other side of the piston 95 when the auxiliary roller 23 has lifted the material 11 off the main roller 14. At other times the piston 95 is vented at both sides thereof to atmospheric pressure. Springs 105 and 106 are provided in the air cylinder 96 for returning the piston 95 to a mean position when both sides of the piston 95 are subjected to atmospheric pressure.

In operation, when it is desired to displace the path of the moving material 11 illustrated in FIG. 4 to the left in order to bring it into alignment with other moving lengths of material, then the valve 100 is operated and held operated until cam 102 operates to allow compressed air from the supply 98 to pass into the right hand end of the cylinder 96 to move the piston 95 and piston rod 94 to the left. This moves the valve spindle 92 of the control valve 107 of the hydraulic system to the left so as to admit hydraulic fluid through the conduit 87 into the cylinder 84. This urges the main roller 14 to the right whilst material is not in contact with it. Movement of the main roller 14 to the right through the extension 97 of the spindle 86 returns the valve spindle 92 to the right so as to cut off the supply of hydraulic cylinder 84 and thus limit the axial movement of the main roller 14. The auxiliary roller is then lowered by the cam shaft 101 to lower the material 11 on to the main roller 14. The cam 102 subsequently returns the valves 103 and 104 into the position in which they vent both sides of the pistons 95 to the atmosphere and spring 105 returns the piston 95 to its mean position. This moves the valve spindle 92 to the right to admit hydraulic fluid to the cylinder 85 pressing the main roller 14 together with the moving material 11 which has been again lowered on to the roller 14 to the left. The feed back of the servo-mechanism ensures that the roller 14 returns to its original position.

It will be appreciated that the embodiment of FIG. 4 can be used similarly to the embodiment of FIG. 2 for keeping a plurality of moving lengths of material in transverse alignment, there being provided a hydraulic servomechanism for each main roller and associated auxilary roller. In the embodiment of FIG. 4, simultaneous operation of both valves 99 and 100 has no detrimental effect upon the apparatus.

FIGS. 5 and 6 show an apparatus for guiding moving material over a main roller 14 which apparatus is purely mechanical in action. Certain parts are omitted from FIG. 5 for the sake of clarity. Each end of the spindle 86 carrying the main roller 14 abuts a cam 110 or 111. The cam 110 has three cam tracks 112, 113 and 114 and the cam 111 has three similar cam tracks 117, 116 and 115 which are asymmetrically arranged with respect to the cam 110. The central cam tracks 113 and 116 are cylindrical so that rotation of the cams when in the position illustrated does not displace the main roller 14 axially. The cams 110 and 111 are slidably mounted on shafts 118 and 119 which are suitable keyways for transmitting rotary motion to the cams, but may preferably be splined for the same purpose. The shafts 118 and 119 are driven in synchronism through gear boxes 120 and 121 from the main cam shaft 101. Cam shaft 101 has cams 122 and 123 for raising and lowering the slides 24 carrying the auxiliary roller 23.

In FIG. 6 the main cam shaft 101 is shown as being driven through the gear box 120 from an electric motor 124. The sliding motion of the cams 110 and 111 upon the shafts 118 and 119 is controlled for example by rods 125 and 126 and suitable mechanisms 127 and 128 having bell cranks or the like. The rods 125 and 126 are actuated from a controller 129 and a further cam 132 is provided on the cam shaft 101 to ensure that the rods 125 and 126 are actuated when the auxiliary roller 23 has lifted the moving material 11 off the main roller 14 and are returned to their mean position shown after the material has been returned on to the main roller 14. The cam 132 also ensures that the cams 110 and 111 are only moved axially when a non-operative part of their cam tracks are in abutment with the ends of the spindle 86. A suitable mechanical or electrical system may be incorporated in the controller 129 so that upon pressing buttons 130 or 131 the cams 110 and 111 are lowered or raised respectively. Suitable mechanical or electrical extensions may be provided so as to enable the apparatus to be controlled from a position remote from the main roller 14. Bowden cables may be provided as a suitable mechanical extension. Alternatively a pneumatic or electrical system may be provided for controlling the apparatus from a remote position similar to that described with reference to FIGS. 2 and 3.

When the button 130 is pressed the cams 110 and 111 are lowered from their mean position shown so that the cam tracks 112 and 115 co-operate to displace the spindle 86 and the main roller 14 to the right. Whilst the main roller is in this position the auxiliary roller 23 lowers the material 11 on to the main roller 14 so that on further rotation of the cams 110 and 111 cam tracks 112 and 115 displace the main roller back to its mean position illustrated together with material thereon. Pressing of the button 130 has thus effectively displaced the path of the moving material 11 to the left. Pressing of the button 131 through the cam tracks 114 and 117 effectively displaces in a similar manner the path of the moving material 11 to the right.

In the embodiment of the invention illustrated in FIG. 7 the auxiliary roller 23 is mounted in bearings 140 and 141 which are attached by cranks 142 and 143 to the supports 30 and 31 rotatably carrying the main roller 14. Thus synchronised rotation of the cranks 142 and 143 causes the auxiliary roller 23 to execute a circular motion in a substantially vertical plane. For simplicity's sake a hand crank 144 and shaft 145 are indicated in FIG. 7 for rotating the cranks 142 and 143, the crank shaft being suitably geared to the cranks 142 and 143.

In operation, upon rotation of the cranks 142 and 143 in an anti-clockwise direction, the auxiliary roller is moved to the right and raised until it lifts the moving length of material 11 off the main roller 14. Further rotation of the cranks causes the material 11 to be carried to the left until it is again lowered on to the main roller 14. Thus the moving length of material 11 can be displaced a predetermined amount to the left or the right by anti-clockwise or clockwise rotation respectively of the cranks 142 and 143.

Instead of a hand crank 144 an electric motor may be provided for turning the shaft 145 or any other convenient means which enables rotation of the cranks 142 and 143 to be controlled from a position remote from the main roller 14.

All of the above embodiments of the invention are adapted to displace the path of the moving material a predetermined distance in one or other axial direction of the rollers. By the incorporation of suitable adjustable valves, for example, in the hydraulic system of the first two described embodiments the axial displacement of the material passing over the main roller can be adjusted.

However, such adjustment may not be necessary, the predetermined axial displacement of material being less than the limit within which it is required to guide the material.

I claim:

1. Apparatus for guiding a moving length of material passing over a main roller, comprising an auxiliary roller placed adjacent and parallel to the main roller, and means for moving said auxiliary roller relatively to the path of the material moving across said main roller to lift the weight of said moving material from said main roller and to replace it and for displacing one of said rollers axially in one direction when the material is in contact with the main roller and in the other direction when the weight of the material is lifted from said main roller.

2. Apparatus according to claim 1, in which the rollers are roughened by circumferential grooves.

3. Apparatus for guiding a moving length of material, comprising a main roller, an auxiliary roller parallel to said main roller and movable relatively to the path of the material as it moves across said main roller to lift the weight of the material therefrom, one of said rollers being axially displaceable in either direction from a mid-axial position, first pressurized fluid actuated means for effecting said movement of said auxiliary roller, and second pressurized fluid actuated means for effecting said axial displacement of said one of said rollers.

4. Apparatus according to claim 3 including electrically operable valve means for periodically supplying pressurized fluid to and releasing fluid from said first pressurized fluid actuated means to periodically move said auxiliary roller to lift the weight of the material from and replace the weight of the material on to said main roller.

5. Apparatus according to claim 4 including further electrically operable valve means for selectively admitting pressurized fluid to and releasing fluid from said pressurized fluid actuated means to effect said axial displacement of said one of said rollers in one direction or the other.

6. Apparatus according to claim 5, including spring means for returning said axially displacable one of said rollers to its mid-axial position.

7. Apparatus for guiding a moving length of material comprising an axially displaceable main roller, an auxiliary roller parallel to said main roller and movable relatively to the path of material passing across said main roller to remove the weight of the material therefrom, pressurized fluid actuated means for effecting said axial displacement of said main roller in either direction, and cam means for periodically effecting said movement of said auxiliary roller.

8. Apparatus according to claim 7 including further cam means for rendering said pressurized fluid actuated means operative only for periods predetermined according to the position of said auxiliary roller.

9. Apparatus according to claim 7 in which said pressurized fluid actuated means comprises a compressed air actuated hydraulic servo-system.

10. Apparatus for guiding a moving length of material comprising an axially displaceable main roller, an auxiliary roller parallel to said main roller and movable relatively to the path of material passing across said main roller to lift the weight of the material therefrom, first cam means for periodically effecting said movement of said auxiliary roller and second cam means for selectively effecting said axial displacement of said main roller in either direction.

11. Apparatus according to claim 10 in which said first and second cam means are synchronised and means is provided for selectively rendering said first cam means operative to effect axial displacement of said main roller in either direction from the mid axial position when the weight of the material is carried by one of said rollers and to return said main roller to its mid axial position when the weight of the material is carried by the other of said rollers.

12. Apparatus for guiding a moving length of material comprising an axially fixed main roller, an auxiliary roller, bearings supporting said auxiliary roller, cranks supporting said bearings to carry said auxiliary roller substantially parallel to said main roller so that for one position of said cranks said auxiliary roller is free of the weight of the material and for at least two other positions of said cranks said auxiliary roller carries the weight of said material to substantially relieve the main roller therefrom, and means for selectively rotating said cranks in one direction or the other to effect a combined axial displacement of said auxiliary roller and movement of said auxiilary roller relatively to the path of the material as it passes over said main roller to effect lateral displacement of the path of said moving length of material.

13. Apparatus for bringing a plurality of moving lengths of material into face-to-face contact and substantially into transverse alignment, comprising a plurality of associate parallel main and auxiliary rollers, a common roller, means for moving each auxiliary roller relatively to the path of a moving length of material as it passes across the associate main roller to lift the weight of the material therefrom, and means for selectively effecting axial displacement of one of each associate pair of rollers from a mid axial position when the weight of the material is substantially carried by said main roller and establishing return of said axially displaced roller to said mid axial position when the weight of the moving length of material is substantially carried by said auxiliary roller member, whereby a plurality of moving lengths of material can be brought into face-to-face contact whilst passing across said common roller and can be guided so that as they are passed across said common roller they are kept substantially in transverse alignment.

14. Apparatus according to claim 13 in which the means for moving said auxiliary rollers relatively to the path of the material as it passes over the associate main roller is common to more than one of said auxiliary rollers.

15. In apparatus for the manufacture of multi-ply webbing in which a plurality of moving plies of material impregnated with a thermoplastic substance are passed through a heating oven to soften the thermoplastic substance and the plies are then pressed together, the improvement which comprises a plurality of main rollers each of which normally carries the weight of one ply of material, a common roller at which the plies are brought into face-to-face contact, a heating oven disposed between said main rollers and said common roller and through which the separate plies are passed to be heated, an auxiliary roller associated with and disposed adjacent and parallel to each main roller, means for moving said auxiliary rollers relatively to their associated main rollers to lift the weight of material therefrom, and means for selectively effecting axial displacement of one of each associate pair of rollers in either direction from a mid-axial position when the weight of the material is substantially carried by said auxiliary roller and effecting return of said axially displaced roller to said mid-axial position when the weight of the moving length of material is substantially carried by said main roller.

References Cited in the file of this patent

UNITED STATES PATENTS

| | | |
|---|---|---|
| 2,236,205 | Wright | Mar. 25, 1941 |
| 2,735,630 | Ziebolz | Feb. 21, 1956 |
| 2,797,794 | Bradley | July 2, 1957 |